United States Patent

Calhoon, Sr. et al.

[15] 3,701,989

[45] Oct. 31, 1972

[54] CENTROID SEEKING METHOD FOR DETERMINING AZIMUTH AND ELEVATION ANGLE SIMULTANEOUSLY

[72] Inventors: Charles D. Calhoon, Sr., Catonsville; Louis P. Goetz, Linthicum; Harry B. Smith, Baltimore, all of Md.

[73] Assignee: The United States of America as represented by the Secretary of the Navy

[22] Filed: April 5, 1963

[21] Appl. No.: 271,557

Related U.S. Application Data

[63] Continuation-in-part of Ser. No. 20,233, April 5, 1960, abandoned.

[52] U.S. Cl..................343/16 R, 343/5 DP, 343/8, 343/9
[51] Int. Cl................................................G01s 9/02
[58] Field of Search............343/16, 16 LS, 8, 9, 5 DP

[56] References Cited

UNITED STATES PATENTS

| | | | |
|---|---|---|---|
| 2,661,467 | 12/1953 | Jones | 343/106 |
| 2,982,956 | 5/1961 | Meyer | 343/17.1 |
| 3,077,595 | 2/1963 | Frost | 343/16 |

FOREIGN PATENTS OR APPLICATIONS

1,147,248   6/1957   France.....................343/5 DP

OTHER PUBLICATIONS

Krantz and Murray, A Survey of Digital Methods for Radar Data Processing, Published in the Proceedings of the Eastern Joint Computer Conference, Dec. 13, 1960, Pages 67–82.

*Primary Examiner*—Carl D. Quarforth
*Assistant Examiner*—J. M. Potenza
*Attorney*—Q. Baxter Warner and H. H. Losche

[57] ABSTRACT

The invention relates to a radar system for determining azimuth and elevation simultaneously. The invention utilizes two radar channels and an antenna having a single reflector and offset feeds which transmit two lobes of energy simultaneously. Reflected energy returning from a target will be intercepted by the upper lobe, lower lobe or both lobes. As the antenna sweeps and the lobe of energy intercepts the target, a number of cycles of transmission-reception and filter scanning is obtained. The respective counts of each channel of received lobe energy is compared and the result of this comparison represents the elevation of the target. Moreover, the system processes the received information to obtain the azimuth location of the target.

4 Claims, 7 Drawing Figures

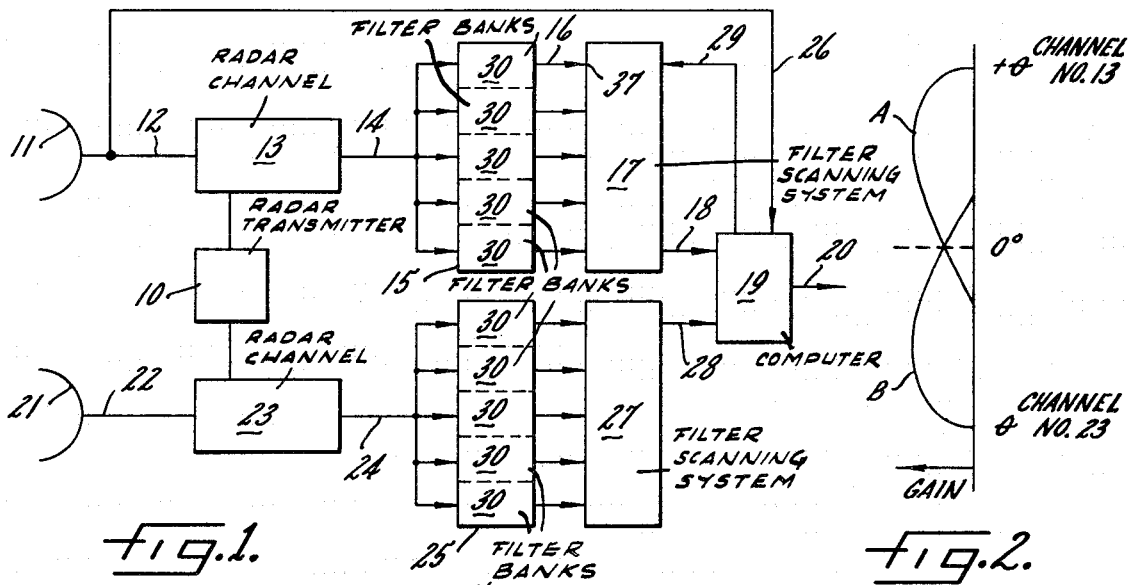
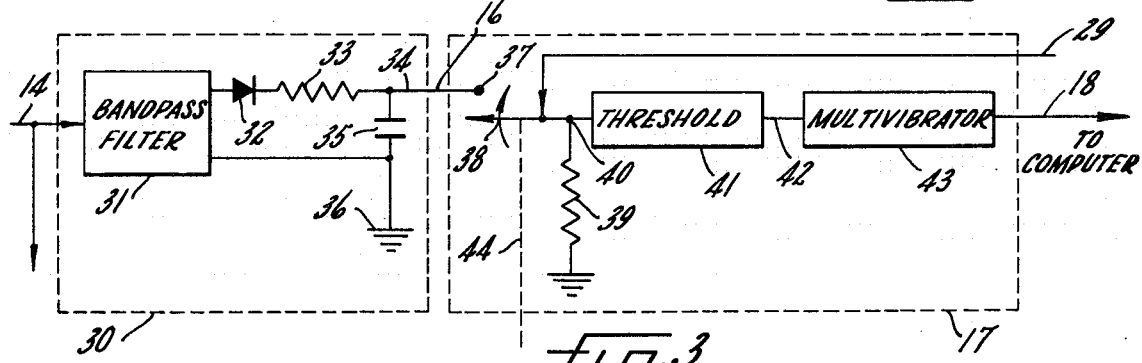
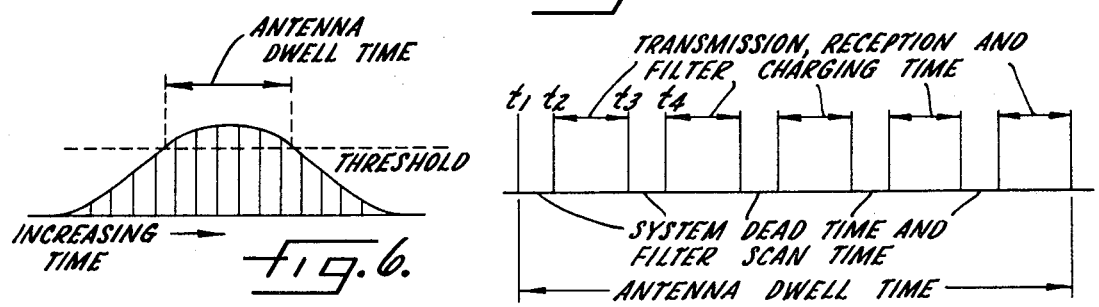
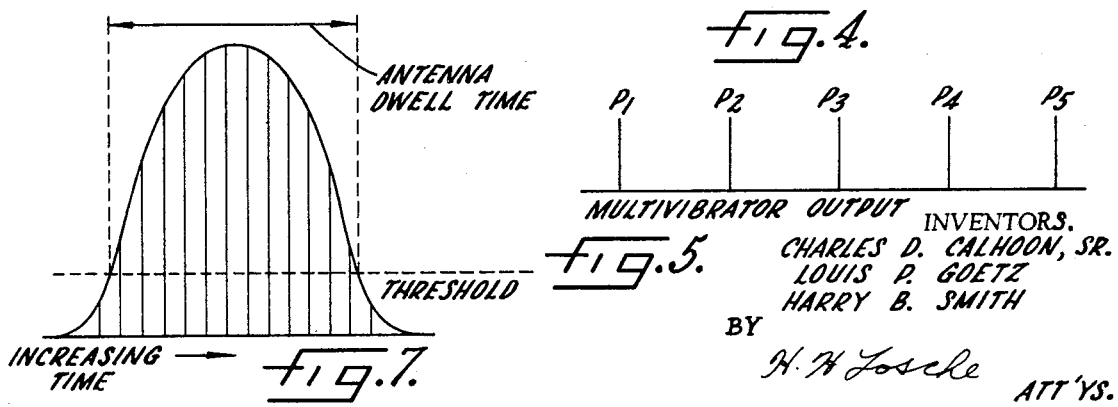
INVENTORS.
CHARLES D. CALHOON, SR.
LOUIS P. GOETZ
HARRY B. SMITH

CENTROID SEEKING METHOD FOR DETERMINING AZIMUTH AND ELEVATION ANGLE SIMULTANEOUSLY

This application is a continuation-in-part of our parent application Ser. No. 20,233, filed Apr. 5, 1960, now abandoned, for A CENTROID SEEKING METHOD FOR DETERMINING AZIMUTH AND ELEVATION SIMULTANEOUSLY.

This invention relates in general to radar and more particularly to target angle resolution in azimuth and elevation.

Prior to this invention the location in azimuth and elevation of a target with respect to a target sighting aircraft has been accomplished by several different methods and frequently by sweeping the radar antenna through a series of scans in azimuth and then in elevation. In this manner the radar could first locate the target in azimuth and then, by use of the elevation scan, locate the target in elevation. This scheme has a disadvantage particularly in the time required to make the separate scans and the accuracy with which angle determinations could be made. The present invention permits reduction in the time required to determine the angular relationship of the target to the sighting aircraft by approximately one-half.

A typical embodiment of the present invention utilizes two radar channels and an antenna having a single reflector and offset feeds which transmit two lobes of energy simultaneously. One of the lobes is directly above the other lobe, both lobes overlapping slightly and being squinted slightly off the antenna boresight axis by the offset feeds. Reflected energy returning from a target intercepted by and located in the lower lobe and not at all in the upper lobe will return to the antenna feed which produces the lower lobe of energy. A target which is in the upper lobe but not at all in the lower lobe will return reflected energy to the antenna feed which produces the upper lobe. Normally, the upper lobe is produced by the lower antenna feed and the lower lobe is produced by the upper feed. A target which is in both lobes is approximately at the axis of the radar antenna and will return energy to both feeds and consequently to both radar channels.

Inasmuch as the present invention is used primarily in track-while-scan pulse doppler radar, each radar channel supplies doppler energy derived from reflected energy to its own separate filter bank where there is a number of bandpass filters each of which will pass a signal to a doppler frequency representative of a particular relative speed between the sighting aircraft and the target. There is associated with each filter bank a scanning circuit which samples the filters to determine whether any filter is passing a doppler signal. The scanning circuit is coupled to a threshold which prevents passage of any signals below the pre-determined threshold. The threshold is coupled to a multivibrator. The multivibrator produces an output whenever the filter scanning system connects to the first filter in a filter bank in which there is a signal above the threshold.

As the radar antenna scans there are periods during which pulsed energy is transmitted. Each of these periods is followed by a system dead time during which the filters, which may have been receiving reflected energy from a target can be scanned by the scanning circuit to produce a multivibrator output providing at least one of the filters contains a signal above the threshold level, indicative of the presence of a target during that particular period. After each period of transmission and reception and the dead time or scanning interval associated therewith, there is another period of transmission and reception followed by another dead time interval. As the antenna sweeps and the lobe of energy intercepts the target, a number of cycles of transmission-reception and filter scanning is accomplished. During that part of the antenna sweep in which the output from the filters exceeds the threshold, the time is referred to herein as antenna dwell time. During the antenna dwell time the multivibrator output, which will consist of one pulse during each scanning interval in which one or more filters are above the threshold level, is counted by a data processing computer and at the end of the antenna dwell time the computer determines the center multivibrator output of those counted and having acquired information regarding the angular position of the T-R reflector at the time when the center multivibrator count was obtained through a servo-synchro system, produces an output representing the "centroid" of the antenna dwell and accordingly, the azimuth location of the target. The fact that there are two channels makes possible a simultaneous determination of the elevation angle of the target. The counts of the two channels are compared and the result of this comparison represents the elevation angle of the target.

It is an object of the present invention to provide a method for determining both the azimuth and elevation of a target during one sweep of a radar antenna in azimuth or elevation. It is another object of this invention to obtain the angular location of the target without reliance on amplitude preservation of signals beyond the threshold circuit. It is a further object of this invention to provide a system which is independent of phase characteristics of the amplifiers. It is another object of this invention to make the foregoing objects feasible in a track-while-scan pulse doppler radar system.

Other objects and advantages of this invention will be readily appreciated as the same becomes better understood by reference to the following detailed description when considered in connection with the accompanying drawings in which like reference numerals designate like parts throughout the figures thereof.

FIG. 1 of the drawing shows in block diagram the major components of a typical embodiment of the present invention, FIG. 2 shows the gain characteristics of a typical antenna configuration useful in this invention;

FIG. 3 shows the construction of the filter bank and the filter scanning system;

FIG. 4 shows the sequence of operations of the system;

FIG. 5 represents the multivibrator output produced during a sequence of operation as shown in FIG. 4;

FIG. 6 shows the level of signals which can be expected at the threshold circuit input caused by a target at long range, and FIG. 7 shows a level of signals which might be expected at the threshold circuit input caused by a target at close range.

Referring to FIG. 1, there is shown schematically radar antenna reflector 11 coupled to radar channel 13 which may be comprised of a T-R switch in series with a pulsed doppler radar receiver of any suitable type, both of which are well-known in the art as evidenced by U. S. Pat. No. 2,927,317 issued to Alexis A. Lundstrom and U. S. Pat. No. 2,923,003 issued to Gilbert L. Hobrough and William V. O'Leary, whose output 14 is coupled to filter bank 15 which may be comprised of a plurality of information centers of the type shown in detail in block 30 of FIG. 3. The arrows between filter bank 15 and block 17, one of which arrows is designated 16, represent the leads from the various information centers 30 in the filter bank to the scanning system 17 which is shown in detail in block 17 of FIG. 3. There is an output from the scanning system 17 to computer 19, which may consist of any suitable programmable airborne real time digital computer many of which are well-known in the art, one such type being disclosed in the article "An Airborne Digital Computer for System Control" by M. M. Dickinson and A. E. Cooper in the 1957 Convention Record of the I. R. E. Professional Group on Military Electronics, whose output at 20 represents the azimuth and elevation angles as will be explained hereinafter.

FIG. 1 also shows reflector 21 coupled to radar channel 23 whose output at 24 is coupled to the filter bank 25 which is coupled in turn to scanning system 27 having an output at 28 to computer 19. Block 10 in FIG. 1, which is coupled to radar channels 13 and 23, represents the energy source to both radar channels for transmission. Conductor 26 provides a constant indication of the instantaneous angular position of reflectors 11 and 21 (and consequently of the scanning beams radiated therefrom) with respect to a fixed reference line of the aircraft in which the system is installed, to computer 19. This information is obtained from a data transmission system incorporated in the mount to which reflectors 11 and 21 are attached which system may be of any well-known servo-synchro type, such as that disclosed in Section 6.7 of *Radar Scanners and Radomes*, Volume 26 of the M. I. T. Radiation Laboratory Series (1948). Conductor 29 provides a "sample" or "read" signal from computer 19 to filter scanning system 17, which is in turn coupled to identical filter scanning system 27, as symbolized in block 17 of FIG. 3 by "broken" line 44, to initiate sampling of filters 30 in filter banks 15 and 25. It should be understood that radar channels 13 and 23, as previously pointed out, may be any conventional pulse doppler radar receiving apparatus and it should be furthermore understood that the separate showing of reflectors 11 and 21 is only for purpose of illustration and that the desired effect can be obtained in other ways such as by a single radar reflector with separate feeds for each of the two channels.

In FIG. 2 the two envelopes designated A and B represent the energy returning into channel 13 and channel 23, respectively. In conventional radar the energy returned to channel 13 would be from the lower lobe and that in channel 23 would be from the upper lobe but for purpose of simplicity in this example and illustration it will be understood that the energy returning to the upper channel 13 will be from an upper lobe and that returning to the lower channel number 23 will be from the lower lobe. In FIG. 2, $+\theta$ represents angles above the antenna boresight line and $-\theta$ represents angles below the antenna boresight line. The boresight line is represented by a dotted line and designated 0° on the figure.

In FIG. 3 there are shown two boxes designated by dotted outlines. The first box 30, which will be referred to as an information center for purposes of reference in this specification, is one of a number which comprise identical contiguous filter banks 15 and 25 of FIG. 1. In information center 30 there is a bandpass filter 31 coupled through a diode 32 and through resistance 33 of RC circuit 33,35 to the terminal 37 in box 17. Box 17 represents the filter scanning system 17 in FIG. 1 to which the circuitry in system 27 of FIG. 1 is identical. In the scanning system 17, there is an input means from each of the information centers 30 of the filter bank 15. In FIG. 3, for the sake of simplicity, only one of these input means and one information center are shown. A sequential filter scanning circuit such as are well-known to those skilled in the art, which is shown schematically in FIG. 3 by the movable arm 38, contacts the various information centers in order, coupling them sequentially through junction 40 to the threshold circuit 41. Threshold circuit 41 is coupled to a multivibrator 43 and the multivibrator output at 18 is coupled to a computer such as 19 in FIG. 1.

OPERATION

For purposes of illustration it will be presumed that operation starts with a system dead time, i.e., the interval following a transmission, reception, and filter charging period represented by times $t_1$ to $t_2$ and $t_3$ to $t_4$ in FIG. 4 in which no energy is being transmitted by or received into and used in the radar channels 13 and 23. During this time scanning circuits 38 contained in filter scanning systems 17 and 27 upon command from computer 19 via conductor 29 sequentially sample each of the information centers in the filter banks with which they are associated, simultaneously. Assume, for example, that one of the information centers in filter bank 15 was energized by energy reflected from a target at a time immediately prior to system dead time and that the energy in that center was above the threshold in circuit 41 of the scanning system 17. There would be produced an output at 18 from multivibrator 43 when the scanning circuit reached that particular information center. Referring to FIG. 4, the dead time mentioned above would be that time between time bar $t_1$ and time bar $t_2$. Referring to FIG. 5, the multivibrator output is represented by pulse $P_1$ which occurs during the system dead time and filter scan time $t_1$ to $t_2$ provided at least one of the filters 30 in filter bank 15 scanned during that interval contained a signal above the threshold level; this pulse $P_1$ is conveyed via conductor 18 to a counter unit of computer 19 where it is retained and added to any additional outputs obtained during successive scans of filter bank 15 in a single antenna dwell time. At time $t_2$ in FIG. 4, the radar transmitter is again actuated and pulsed energy is again transmitted from reflectors 11 and 21 during the period of time from $t_2$ to $t_3$. During this time reflected signals are received in the radar receiving channels 13 and 23 provided of course that there is a target somewhere within the lobes of the transmitted radar energy such as, for example, would occur if the target were on the boresight axis of the antenna. During the time $t_2$ to $t_3$ there is ample opportunity for any filters in filter bank 15 and filter bank 25 to become energized by radar return signals. Which of the filters is energized will depend on the doppler frequency entering the filter banks 15 at 14 and 25 at 24. However, if there is a target on the antenna boresight axis, at least one filter in each of the banks 15 and 25 will be energized. When there is a multivibrator output from circuitry 17 or 27, or as there would be in this particular instance from both 17 and 27, the computer 19 will count one signal from each in its respective counters associated with conductors 18 and 28. This output from the multivibrator which is made possible by return signals during the transmission and reception interval $t_2$ to $t_3$ of FIG. 4, is obtained during the next subsequent system dead time and filter scan time $t_3, t_4$. This multivibrator output is represented in FIG. 5 by $P_2$. As the antenna continues to scan and so long as the target remains in the energy lobe such that it provides return signals above the threshold, a multivibrator output will be produced each time the scanning circuitry scans the filters. For purposes of illustration in this example this effect is produced five times. When target returns in the filter banks cease to exceed the threshold level, there will be no more multivibrator outputs and accordingly, computer 19 will produce an output which represents the center count of the total number of multivibrator outputs during that particular antenna dwell time. This output can then be associated by conventional circuitry which may be of the servo-synchro type previously described, with the angle of the antenna at the center count or "centroid" of the antenna dwell, this angle being taken to represent the azimuth angle of the target. This particular output is known as the centroid and this manner of obtaining the azimuth angle of the target is known as centroid seeking. FIG. 6 shows the type of signal level which could be expected at the threshold circuit input junction 40 for a distant target. In this instance the signal exceeds the threshold five times and represents the type of signal level associated with the example of operation just presented. For targets at close range, the signal level at the input to the threshold circuit may exceed the threshold a number of times during the antenna dwell time. This effect is illustrated in FIG. 7 which shows the signal at the threshold input above the threshold level 12 times. Accordingly, twelve multivibrator outputs would be produced during the antenna dwell time of one antenna sweep.

It should be realized that with the target on the axis of the boresight in elevation and an antenna sweeping in azimuth the effect in both the channels 13 and 23 and the outputs 18 and 28 are identical assuming, of course, that all equipment is in proper operating condition. Accordingly, the count from each filter bank and the input to the computer 19 from 18 and 28 is equal. However, if the target appears exclusively in the upper channel, for example, the entire count entering the computer 19 would be from 18 and there would be no count entering from 28. Inasmuch as the computer 19 is capable of solving an equation of the form $$Q_E = K (N_{13} - N_{23}/N_{13} + N_{23})$$

where $N_{13}$ is the count from channel 13 and $N_{23}$ is the count from channel 23 and $K$ is a constant depending on actual antenna cross-over characteristics, the computer will produce an output indicating that the target is above the boresight axis and also the azimuth angle as noted above. The amount of elevation of the target above the boresight axis is represented approximately by the solution of the above equation. Where the target appears just slightly above the boresight axis but is intercepted by the lower lobe as well as the upper lobe there will be counts in the computer 19 from both the filter scanning systems 17 and 27 and then the computer in solving the equation will come up with a solution indicative of a target slightly above the boresight axis.

Computer 19 has been assigned two functions in this specification. One of these is to count multivibrator outputs from both channels during successive scans in a single antenna dwell time and find the centroid of the counts for association with the angular position of the antennas at the time the centroid count was received, this angular position being taken to be the azimuth position of the target. The other is to compare the counts of the two channels, solving the equation set out above. Inasmuch as the computations required are conventional and the computer itself does not constitute our invention, the invention may be practiced using any of the many suitable forms known to and available to those skilled in the art and suitable for aircraft installation, a specific embodiment of which has been previously referenced.

The invention has been described for the most part in an embodiment using antenna sweep in azimuth for centroid seeking and a pair of elevation channels for elevation angle determination. However, it should be noted that the invention may also be useful with antenna sweeping in elevation whereupon elevation angle could be determined by centroid seeking and azimuth by use of the separate channels. Reference to horizontal sweeping of the antenna has been only for illustration.

It should also be noted that with one sweep in azimuth of the antenna in one direction such as from left to right for example, the elevation of the target can be determined within approximately two beam heights. With the return of the antenna another two beam heights approximately can be searched in elevation so that the total coverage in elevation possible during one complete scan of the antenna from left to right and back is approximately four times the height of the lobe.

The drawings and description of this invention have set it out in an embodiment particularly adapted to use in a doppler radar system. However, the invention may also be practiced with other types of radar, whereupon the filter banks and filter scanning system may be considerably simplified if not eliminated.

Therefore, while this description is intended to set out a typical employment of the method of this invention it should be understood that numerous modifications may be made therein without departing from the spirit and the scope of the invention as set forth in the appended claims.

What is claimed is:

1. A target angle resolution system comprising:
   radar transmitting and receiving means alternately and directionally transmitting pulse energy and directionally receiving available reflected energy signals, said alternate transmission and reception occuring a plurality of times during a movement by said radar means of successive transmissions through a scan angle with respect to said radar means in any desirable plane, each pulse transmission being preceded by a short period of absence of transmission and reception activity;

means coupled to said transmitting and receiving means for eliminating insignificant reflected energy signals and producing separate outputs representative of significant reflected energy signals received during successive pulses, said means for eliminating and producing comprising coupling circuitry, a threshold circuit connected to said coupling circuitry, and a pulse producing circuit coupled to said threshold circuit, said coupling circuitry comprising bandpass filter means, and switching means coupled between said bandpass filter means and said threshold circuit; and a digital computer coupled to said means for eliminating and producing, to count said separate outputs produced during movement of said transmissions through a dwell angle portion of said scan angle during which movement significant reflected energy is received, and to produce information representing the center of said dwell angle.

2. A target angle resolution system comprising:

pulse Doppler radar transmitting and receiving means alternately and directionally transmitting pulse energy and directionally receiving available reflected energy signals, said alternate transmission and reception occurring a plurality of times during a movement by said radar means of successive transmissions through a scan angle with respect to said radar means in any desirable plane, each pulse transmission being preceded by a short period of absence of transmission and reception activity;

means coupled to said transmitting and receiving means for eliminating insignificant reflected energy signals and producing separate outputs representative of significant reflected energy signals received during successive pulses, said means for eliminating and producing comprising coupling circuitry, a threshold circuit connected to said coupling circuitry, and a pulse producing circuit coupled to said threshold circuit, said coupling circuitry comprising signal acceptance and storage means, and switching means coupled between said signal acceptance and storage means and said threshold circuit, said signal acceptance and storage means including a bank of separate bandpass filters, each filter having a different pass band from the others, and a storage circuit coupled to each filter, and said switching means being a sequentially scanning switch for scanning separately the storage circuits; and a digital computer coupled to said means for eliminating and producing, to count said separate outputs produced during movement of said transmissions through a dwell angle portion of said scan angle during which movement significant reflected energy is received, and to produce information representing the center of said dwell angle.

3. The resolution system of claim 2 wherein the movement by said radar means of the successive transmissions is through scan angles in azimuth planes and in elevation planes and the information produced in said scans represents the angle co-ordinates in azimuth and elevation of a reflector of significant reflected energy signals.

4. A target angle resolution means comprising:

pulse Doppler radar transmitting and receiving means alternately transmitting partially overlapping lobes of energy pulses and receiving reflected energy signals available from each of said lobes, said transmitting and receiving means including receiving channels separate from each other, each of said channels being capable of receiving energy from a different one of said lobes, said alternate transmission and reception being accomplished a plurality of times by said transmitting and receiving means while antenna means within said transmitting and receiving means and coupled to said channels moves said lobes through a scan angle in azimuth and produces said overlapping lobes each having one axis in a vertical plane containing the axis of the other, each of the times of said plurality being separated by a time of absence of transmission and reception;

means for selecting including banks of bandpass filters coupled to each of said channels, for selecting significant reflected energy signals and producing output pulses representative of the reception thereof; and a digital computer coupled to said means for selecting, to count output pulses from each of said channels, and to produce information representative of the center of the portion of said scan angle in which significant signals are reflected from said lobes, which of said lobes contains the origin of stronger reflected energy signals, and where within said lobe said origin is located, said information representative of the center of the portion of said scan angle indicating the angle co-ordinate in azimuth of the said origin and the said information representative of the lobe location of said origin indicating the angle co-ordinate in elevation of said origin.

* * * * *